Sept. 15, 1959  F. J. FÖRG  2,904,474
PROCESS AND MEANS FOR CARRYING OUT
BACTERIOLOGICAL OPERATIONS
Filed Sept. 26, 1955  3 Sheets-Sheet 2
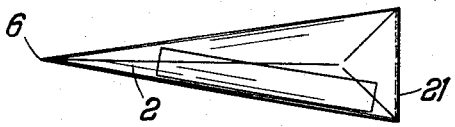
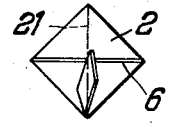
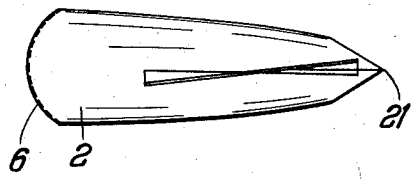
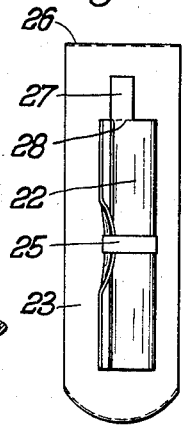
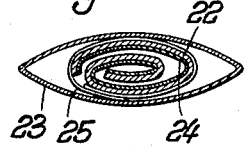
Inventor:
Friedrich Josef Förg

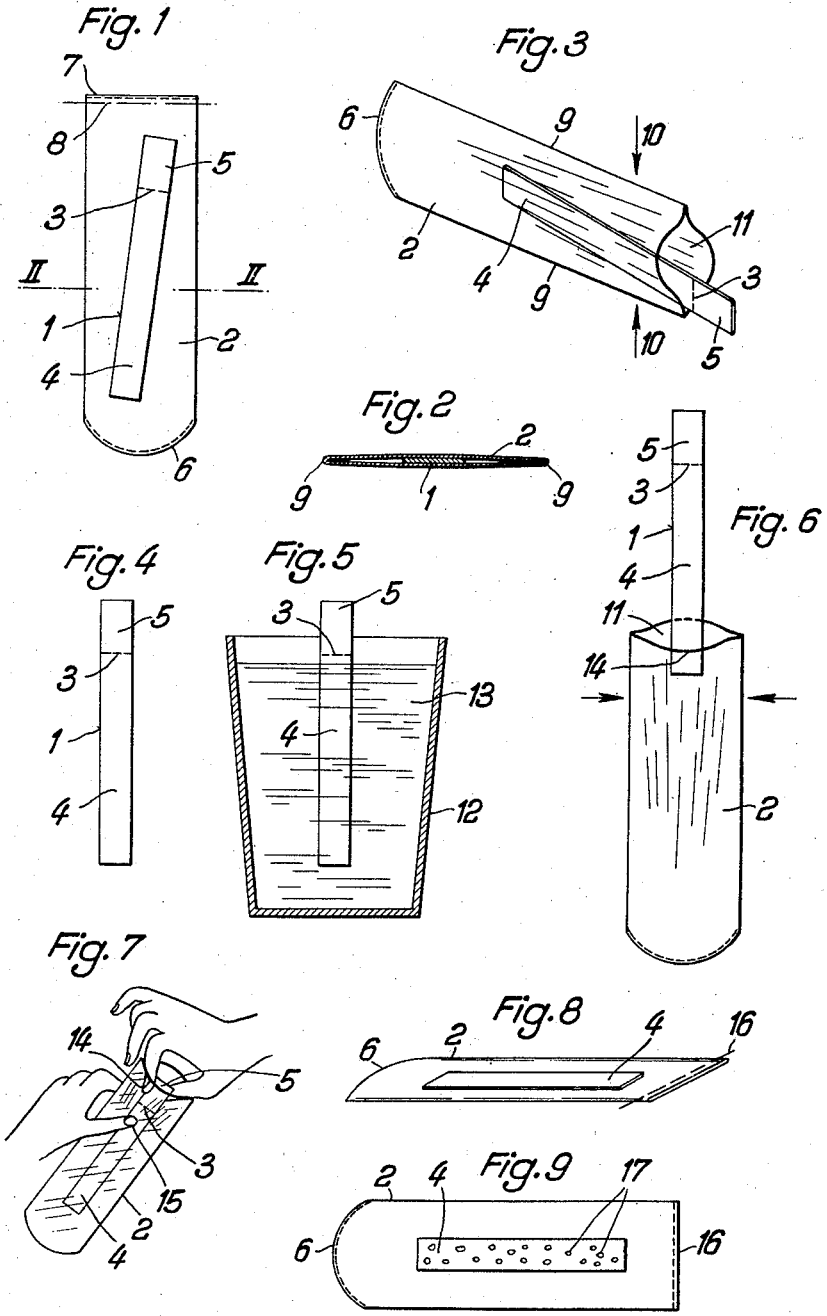

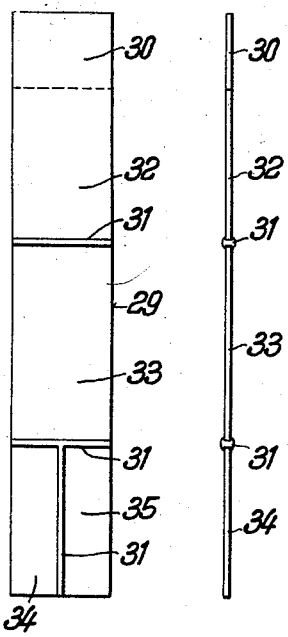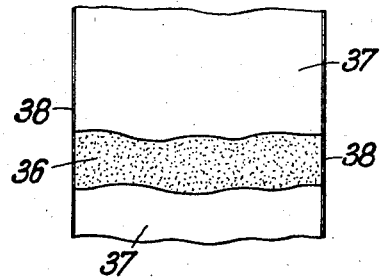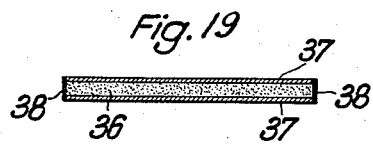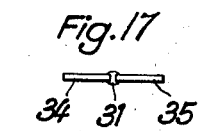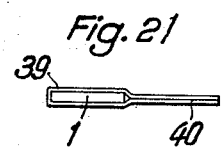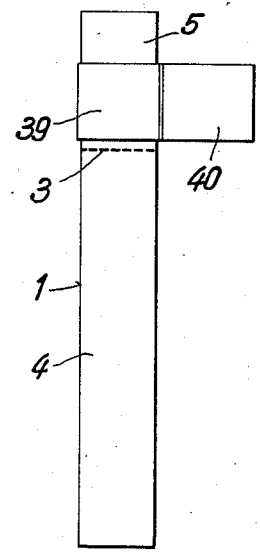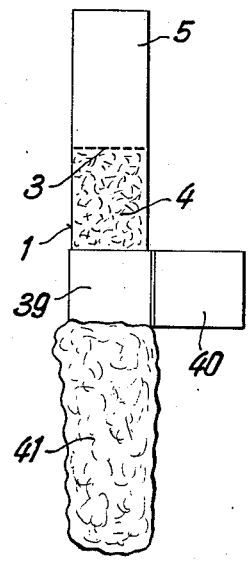

United States Patent Office 2,904,474
Patented Sept. 15, 1959

2,904,474

PROCESS AND MEANS FOR CARRYING OUT BACTERIOLOGICAL OPERATIONS

Friedrich Josef Förg, Munich, Germany, assignor to Bacto-Strip A.G., Zollikon-Zurich, Switzerland Application September 26, 1955, Serial No. 536,641

Claims priority, application Germany October 4, 1954

7 Claims. (Cl. 195—139)

This invention relates to a new method for proving certain types or groups of bacteria in liquids, samples of the liquids to be tested for the presence of bacteria being transferred to sterile specific nutrient substances and if necessary nutrients containing test materials, in order to watch or measure biological changes peculiar to the bacteria occurring under suitable conditions.

Hitherto bacteriological operations of this kind have usually been carried out by removing with sterile means a sample of the liquid to be tested from the container holding the liquid and mixing the sample with the nutrient in a vessel which can be closed in a sterile manner, e.g. a test tube or a Petri dish, or spreading it on a nutrient.

The substances used as nutrient bases for the bacteria cultures are generally gelling substances, such as for example, agar-agar, gelatinous silica or gelatine itself, into which are stirred the nutrient substances suitable as nutrient media for the bacteria and if necessary also additional substances serving, for example, as detection indicators. A viscous specifically prepared nutrient medium obtained in this manner is poured into the aforementioned sterile container, where it constitutes a closed more or less soft mass in which the bacteria meet the conditions necessary for their development. The gelatinous substances facilitate the diffusion of the nutrient media and of the products of metabolism of the bacteria.

These working methods which are generally used, required, when examining liquids, the employment of sterile pipettes, which have to be cleaned and re-sterilised each time after they have been used. In addition, it is necessary to have incubating or storage containers of solid material, such as, for example, glass or metal, which have to be cleaned after each examination process has been completed and sterilised again for the next time it is used.

The disadvantage of the processes formerly employed consists mainly in the heavy expense for appliances, material and labour, which enables these processes to be used practically only in a suitably equipped laboratory.

The main object of the present invention is to provide a novel process and novel means for carrying out bacteriological work, more especially for detecting certain types or groups of bacteria in liquids, which process and means are especially suitable for high-speed examinations and are capable of being used at any time, even outside a laboratory, without relatively high expense for equipment and devices.

A further object of the invention consists in providing such a simplified process with which it is possible to obtain both a qualitative and also quite an accurate quantitative detection of certain types of bacteria.

The invention also has for its object to eliminate the labour costs which were formerly necessary for cleaning and sterilising the equipment and to provide means by which the novel process may be carried into effect and which can be manufactured in such manner that they take up only a small amount of space, are resistant to breakage and therefore stand rough handling and can be operated in a particularly simple manner, even by unskilled persons.

Further objects and characterising advantages of the process according to the invention and of the means to be used for carrying such process into effect will be apparent from the description which will subsequently be given concerning a number of examples of construction and application.

The essential feature of the invention is to be seen in the fact that for the purpose of eliminating special auxiliary means which have to be carefully maintained for transferring the substances to be investigated for the presence of bacteria to a nutrient medium, a carrier for the sterile substance of the nutrient medium is constructed in such manner that the said carrier can itself be used directly as means for removing the substance to be examined. For this purpose, according to the invention, the carrier used for the sterile nutrient substance comprises a mechanically strong flat structure which can be freely handled and which consists of a sterilisable absorbent and/or swellable material which does not disadvantageously influence the development of the bacteria, the said structure being in the form of a sheet or strip which is brought into intimate contact with the liquids immediately after having been extracted from a sterile packing and is then introduced into a sterile sheath, preferably made of material with a high rupture strength, for example, an elastic foil, and stored or incubated in this sheath under conditions promoting the growth of the bacteria until the presence of certain types or groups of bacteria can be detected by means of specific reactions which are known per se.

The flat structure or sheet or strip can consist of absorbent paper, for example, filter paper or blotting paper, or of an absorbent plastic of porous structure. An essential condition for the use of the sheet or strip in the novel process is that the inherent strength of the flat structure—particularly in the wet state—permits it to be freely handled without the sheet or the strip being thereby torn or otherwise damaged.

The use of absorbent and/or swellable paper for the preparation of the nutrient medium which can be handled freely has above all the advantage that the materials mainly cellulose, used for the manufacture of the paper are not able to exert any disadvantageous influence on the development of the bacteria if the initial materials are carefully cleaned, and that the sheets or strips show a comparatively high mechanical strength even if the said sheets or strips are of small thickness.

A thin sheet or a thin strip has the advantage that colonies of bacteria which are developed on or in the sheet and are recognisable by their specific reactions can also be quite accurately determined numerically, especially if bleached and more or less translucent paper is used.

According to the invention, the sheet which contains the sterile substances forming the nutrient medium is to be prepared with known specific test substances for bacteria prior to being used.

A "culture substance" or a "nutrient medium" as used in the foregoing and following explanations is usually already specially adapted, by specific additives, to a group of bacteria which is to be detected by working with this nutrient medium, in that substances promoting the growth of this group of bacteria are contained therein. Included among these additives are also substances with an acid or basic reaction, which permit a predetermined pH value to be produced in the nutrient medium, this pH value being of particular service for the development of certain types of bacteria. Such specifically prepared nutrient media are per se already used on a large scale with bacteriological work of all types; their composition and the method of their manufacture do not come within the scope of the present invention.

By the expression "test substances" used above, there is to be understood all those substances, the presence of which in the nutrient medium either prevents the development of certain types of bacteria or which, owing to the metabolism processes of the bacteria, undergo chemical changes which can in some way be observed or measured. Among such test substances are to be more especially considered dyestuffs which show a clearly detectable change in colour with a variation of the pH value or owing to other chemical influence on the dyestuff. Among test substances of this type, it is also possible to understand test organisms, the development of which is promoted or stopped by certain bacteria. These test substances are also known as regards their use as additives to a nutrient medium of the conventional type.

Under certain conditions and especially when using relatively large sheets, it is recommended that the said sheet should be reinforced, preferably at its edges, by inserts of high-strength materials which are neutral with respect to bacteria.

The process can be carried into effect in an extremely simple manner by use of the novel means.

Such a sheet provided with a moist nutrient medium can also be used for detecting bacteria in gases, in that the said sheet is exposed for some time, for example, to a stream of the gas which is to be investigated for bacteria content and is then enclosed in sterile fashion in the sheath.

For detecting bacteria in liquids, there is employed according to the invention a sheet prepared in advance with nutrient media and/or test substances, which sheet, after the nutrient medium and/or test substances have been applied, is dried under sterile conditions, preferably in vacuo and thereafter packed in sterile fashion. The sheet is removed from its sterile packing, dipped into the liquid and, after being fully saturated with liquid, it is introduced into a sterile sheath, the sheath is closed and the incubation of the culture is carried out.

If it is desired to carry out quantitative investigations with liquids, it is proposed according to the invention to use an absorbent and/or swellable sheet with a specific absorption capacity which is accurately known, which sheet always takes up a constant amount of liquid per unit of volume of the sheet when it is immersed in a predetermined liquid. By this means, it is possible to arrange for a sheet of specific surface area to absorb, for example, 0.1 ml. of a liquid to be examined and, from the number of colonies of bacteria becoming visible when the sheet is incubated, to determine directly the number of bacteria which were contained in 0.1 ml. of liquid.

With bacteriological operations of this nature it is extremely important that the work is carried out under satisfactory sterile conditions in order to prevent the occurrence of undesirable bacteria in the culture substance.

According to the invention, this problem is solved by the fact that the sheet, preferably made in strip form, is given a handle which is readily separable from the sheet or strip and by which the latter can be directly gripped in order to remove it from its sterile packing, and which in addition serves for retaining the sheet which the latter is dipped in a liquid or pressed on to the surface of a body. This handle, which is no longer sterile because of being gripped, is to be detached upon introducing the sheet into the sterile sheath protecting the sheet during the development of the bacteria cultures, this being done prior to the sheet being sealed in the sterile sheath.

With sheets or strips which are intended for the examination of liquids, the nutrient media and test substances or indicators must usually be associated as solutions with the sterilised sheet or strip so that the latter absorbs the solutions; thereafter, the strip is dried, so that it is again given the absorption capacity necessary for its use. This drying of the sheet or strip can usually be only carried out in vacuo at the speed required for a large-scale production of these sheets or strips, since a large number of the dyestuffs used as indicators are sensitive to temperature and are easily decomposed at high drying temperatures. When using vacuum drying, it is possible by increasing the vacuum and drawing off the vapours formed to carry out the drying quickly at about room temperature or only slightly higher temperatures, at which there is no danger of decomposition of the indicators.

In order more fully to explain the invention, a number of embodiments of the sheet or strip and of its packing and its sheath, respectively, are shown in the drawing; in addition, essential parts of the process are explained by reference to figures. The views given in the drawings merely represent examples of carrying the process into effect and the means used in the process; they are not in any way to restrict the scope of the invention to the examples which are illustrated.

In the accompanying drawings:

Figures 1 to 9 are views of a carrier which is in the form of a strip and which is provided with culture substance and indicators, such as used for detecting *coli* bacteria in a liquid, for example, milk, Figure 1 being a view of the strip in its packing, as it can be bought from the manufacturer;

Figure 2 a cross-section through the packed strip according to Figure 1, the section taken on the line II—II of Figure 1 and on an enlarged scale;

Figure 3 showing the extraction of the strip from its packing;

Figure 4 the strip extracted from its packing;

Figure 5 showing the immersion of the strip in a vessel filled with liquid, the strip being charged with liqud and with the bacteria contained in the liquid;

Figures 6 and 7 showing the introduction of the strip fully charged with liquid into the sterile sheath, in which the strip is thereafter sealed in sterile fashion for carrying out the incubation;

Figure 8 showing the liquid-containing strip arranged in the sterile sheath and after the sealing of the latter; and Figure 9 showing the strip in its sheath, after the incubation and the development of several colonies of *coli* bacteria;

Figures 10, 11 and 12 are respectively a side elevation, plan view and end elevation of one particular method of use of the sheath used for protecting the strip during the incubation process;

Figures 13 and 14 show a flat structure in the form of a large sheet and in its wrapping, the said sheet being loosely coiled to form a roll; Figure 14 is a cross-section to a larger scale;

Figures 15, 16 and 17 show a strip divided into sections;

Figure 15 being a plan view of the strip,
Figure 16 a side elevation thereof, and
Figure 17 an end view.

Figures 18 and 19 show a strip provided with a filter covering;

Figure 18 being a plan view of the strip, parts of the individual layers being broken away, and Figure 19 a cross-section through the strip according to Figure 18.

Figures 20, 21 and 22 show a strip with a stripper device, such as suitable for taking samples from viscous liquids, Figure 20 showing the strip in side elevation,
Figure 21 the same strip in plan view, and
Figure 22 showing the strip at the time of actuating the stripper device serving for stripping off an excess of the viscous liquid.

Figures 1 and 2 show the strip 1 serving as carrier for the substances of the nutrient medium and specific test substances (indicators) for *coli* bacteria, which strip is initially firmly sealed inside a bag-like sheath 2 made of a transparent plastic foil. The strip 1 consists of absorbent and swellable paper, and it is subdvided by a perforation 3 into a lower long strip section 4 and an upper short section 5 serving as handle. The paper strip 1 has the absorption capacity of a filter paper or blotting paper, it is prepared with specific nutrient media for *coli* bacteria and with an indicator which changes its colour owing to the action of the metabolism process changes of the bacteria.

For investigating milk, the strip is prepared in the following manner:

The strip is first of all immersed in an aqueous solution of the nutrient media, it being preferable for a large number of initially still connected strips to be drawn through a bath containing the solution of nutrient media. The said solution may also already have an indicator added thereto.

As examples of such impregnation solutions for sheets or strips with which *coli* bacteria are to be detected in milk, there are mentioned two prescriptions which can be used at will:

(a) 10 g. of peptone (as nutrient substances, which contain albumen (nitrogen) and carbohydrate)
    10 g. of lactose
    20 g. of ox gall (for specifically promoting growth of coliform bacteria)
    0.0013 g. of brilliant green together dissolved in 1 litre of water.

(b) 10 g. of peptone
    10 g. of lactose
    10 g. of ox gall and
    0.04 g. of gentian violet to 1 litre of water.

A specific dye indicator is added to both solutions.

It is of course also possible to use other suitable substances, for example, the constituents of the formiate-ricinoleate medium according to Stark and England, used in Switzerland and the United States of America for known standard investigations in the milk industry.

The setting of a suitable pH value is effected by buffering agents which are known per se, for example, albumen hydrolyses or amino acid mixtures.

The concentration of the solution and the mixing ratio of the substances can be varied within wide limits.

The strips fully saturated with nutrient solution are then dried, preferably in vacuo, at temperatures from 30 to 60°, are thereafter separated by cutting and packed in sterile form in the pocket-like plastic sheath 2. The plastic sheath 2 is made of a thin-walled transparent plastic tube and it is closed at the end by an arcuate heat-sealed seam 6. After the strip 1 has been introduced, the upper end of the plastic tube forming the sheath 2 is sealed off by a heat-sealed seam 7.

The sheath 2, which is already pressed flat with the forming of the heat-sealed seams, therefore tightly encloses the strip 1, as will clearly be seen from Figure 2. Since the strip itself is completely dry and is protected by the moisture-tight plastic sheath against the access of moisture, it can be preserved for a long time in its sterile closed packing without there being any decomposition of the nutrient media or any chemical influence on the indicators. Owing to its flat formation, the closed package only takes up a very small amount of space, so that even relatively large quantities of such packed test strips can easily be stored and in addition no attention has to be paid to the moisture in the ambient air.

When the strip is to be used, the sheath 2 is opened by an incision immediately below the seam 7 and the sheath 2 is pressed up by pressure at its side edges 9 (see the arrows 10 in Figure 3, which show the direction of the pressure). This pressing up of the sheath 2 is facilitated by the arcuate form of the seam 6 closing the bottom of the sheath. By holding the sheath 2 at an angle, the strip 1 is now caused to slide so far out of the opening 11 of the sheath 2 that its upper section 5 can be gripped by the fingers. Care is to be taken th only the upper separable section 5 is touched, so that the longer strip section 4 actually required for the test is not infected. The strip is then dipped into a vessel 12 containing the milk 13 to be investigated substantially as far as the perforation 3, the lower strip section 4, which is completely immersed in the milk 13, being completely saturated with milk according to its absorption capacity. The saturation of the strip is effected in an extremely short time; it is therefore sufficient for the strip to be immersed in the milk for at the most one second. The strip 1 extracted from the milk is briefly shaken and replaced in the sheath 2, which is again kept fully open by pressure at the side edges (see Figure 6). The strip is introduced to such a depth into the sheath 2 that the perforation 3 is disposed approximately 1 cm. below the edge 14 of the opening 11. Thereafter, pressure is applied to the side surfaces of the sheath 2, approximately at the position indicated by 15 (see Figure 7), in order to retain the strip section 4 in the sheath and the strip section 5 serving as a handle and infected by contact with the hand is separated from the remaining strip section 4 by pullling. The test section 4 of the strip is now once again inside the sterile sheath 2, the opening 11 of which can be closed by folding over, by a milled seam or by heat-sealing the thermoplastic foil forming the sheath along a seam 16.

The sheath 2, now sealed and containing the strip section 4, is now introduced into an incubation chamber, which is kept at a temperature in the region of 37°. In the course of about 10 hours, a series of *coli* bacteria colonies 17 have developed on the test strip, the positions of these colonies being clearly recognisable by obvious discoloration of the dyestuff serving as indicator (see Figure 9). These coloured dots always indicating the presence of a colony of *coli* bacteria can easily be counted with the naked eye.

Since the section 4 of the test strip absorbs very exactly 1 ml. of milk when it is dipped into the latter, it is possible from the number of coloured dots to determine exactly the number of bacteria present in 1 ml. of milk. If the actual problem is solved by this determination, the strip together with its sheath can be thrown away.

However, if value is attached to keeping a record of the test results, the strip provided with the coloured dots can thereafter be sterilised, for example, by applying heat, and thereby dried, and can be directly preserved as a file document.

Since the strip is only made comparatively thin and consists of bleached translucent material, the colonies of bacteria disposed inside the strip are also clearly visible by suitable discolouration. As a result, it is guaranteed that in the counting, which takes place from both sides of the strip, actually all the colonies of bacteria being developed in the strip are satisfactorily included.

When using thicker less translucent sheets or strips, the counting of the colonies of bacteria can be facilitated by the sheet or strip being made transparent after its incubation by physical means, for example, by impregnation with liquid paraffins or fats, in order that the changes taking place inside the sheet or strip and indicating the location of a colony of bacteria are also made clearly visible.

Since the time necessary for taking the sample and for closing the strip dipped in milk inside its sheath amounts in practice to scarcely one minute, a quantitative proof of *coli* bacteria in milk can therefore readily be carried out in about 10 hours. The only aid which is required in addition to the strip and its wrapping, is an incubation chamber in which a temperature of about 37° can as far as possible be kept constant. Since the strips in their sheaths are completely sterile and protected against infection, it is possible to work with any desired heating source, which temporarily can be produced easily.

It may further be mentioned that test strips which are not incubated immediately after taking the sample can also be preserved for several hours in a refrigerator at temperatures of 1 to 5° C. without falsifying the result, so that, for example, the incubation of the test strips obtained in the course of a day in a dairy can if necessary be carried out at the same time.

If the bacteria or fungus germs to be detected are aerobic germs, a certain amount of air or oxygen must be available for the development of these germs during the incubation process. This requirement can easily be fulfilled with the arrangement according to the invention by the fact that the sheath 2, after the introduction of the strip 1, is not closed in the manner characterised by Figure 8 in the form of a flat pocket containing only a small amount of air (by making the closure seam parallel to the weld seam 6 closing the bottom of the sheath 2), but by providing the closure seam 21 in a plane extending at right-angles to the seam 6 (see Figures 10, 11 and 12). The sheath 2 then forms a hollow body which contains a comparatively large amount of air, so that the oxygen contained in this air is fully adequate for the development of even a relatively large number of colonies. It is obvious that this different method of closing the sheath can also be used with strips such as have been illustrated in Figures 1 to 9. It is not restricted to the use of the impressed strips.

The incubation of the strips provided with bacteria is in principle carried out in the same manner as with the previous example; according to the nature of the bacteria to be detected, and after a prescribed incubation period, either colour changes caused by reactions of the products of metabolism of the bacteria are shown on the strip, or for example, in the case of mould fungi, there are produced clearly visible colonies which stand out distinctly on the strip due to their colouring.

For the cultivation of anaerobic germs, it is possible to use the same sheath 2 if the air is almost completely forced out by compression prior to the closing of the sheath. The same effect can also be produced by a sheath of shrinking foil, which has recently become known as a packing foil, more especially for foodstuffs, which contracts to a considerable extent by thermal or chemical influence, for example, by dipping in hot water.

It is also possible for a container with a chemical reagent, for example, a reagent absorbing oxygen, to be enclosed in the sheath and for this container to be opened after the sheet or strip has been enclosed in the sheath, the said container being perhaps opened by rupturing or tearing, so that the reagent is able to act on the content of the sheath.

If bacteria forming spores (permanent forms) are to be detected, it is expedient to use a sheath which is resistant to sterilisation temperatures higher than 100° C., in which sheath the sheet provided with bacteria is heated to a temperature at which only the spores of the bacteria remain capable of living, after which the incubation is carried out.

For the detection of bacteria which form gases by biological processes, it is possible to proceed in such manner that the sheath, which is closed and preferably heat-sealed in gas-tight manner after introducing the sheet or strip is punctured after relatively large amount of gas has been formed, the gases contained in the sheath are extracted by suction or forced out by elastic deformation of the sheath and analysed.

The process according to the invention can also be used in advantageous manner for health tests on the water of rivers and lakes, more especially for the quantitative determination of the content of pathogenic germs therein.

In order to be quite certain with such an investigation, since water usually only contains a few of such germs, it is necessary to examine a large quantity of liquid. For this purpose, a relatively large sheet is used, which is not used while stretched out flat, but in the form of a coiled roll, in order that it may be supplied in a small wrapping and can also be incubated after the sample has been taken. The sheet form has per se the advantage that the colonies of bacteria forming on the thin sheet can be accurately counted; the rolling of the sheet, however, enables a sheath with a small volume to be used. Figure 16 shows such a rolled sheet 22 in its sheath 23, in the form in which it is supplied by the manufacturer.

The sheet 22 forming the roll is preferably impregnated with specific nutrient substances and indicators prior to being rolled. As one example of an impregnating solution suitable for the detection of typhus germs, it is possible to use the following:

375 ml. of tryptically digested skimmed milk,
25 g. of dextrose,
25 g. of dry sodium phosphate,
25 g. of bismuth-ammonium citrate,
12.5 g. of sodium sulphite
3.25 g. of ferro-ammonium sulphate,
0.125 g. of brilliant green and a colour indicator, together dissolved in 1 litre of water.

Following the impregnation, the sheet is first of all dried, preferably in vacuo. Thereafter, an elastic sterile foil 24 is laid on the sheet, which is inserted between the individual layers of the sheet when the latter is rolled and separates the said layers from one another (see Figure 17), so that colonies of bacteria cannot spread on to adjacent parts of the roll which contact one another and thus simulate the existence of a larger number of colonies.

The roll is thereafter held together by means of a foil ring 25. In use, the sheath is opened in known manner at its upper smooth heat-sealed seam 26, the sheet is allowed to slide out so far that it can be gripped by its handle portion 27, and the rolled part of the sheet is then dipped into the water to be examined. This sheet has quite a specific size and absorption capacity, so that it takes up an accurately defined amount of water, for example 10 ml. Following the immersion of the sheet, the excess water is allowed to drip off, the rolled sheet is returned into the sheath again and the latter is closed by pressing or heat-sealing the opening after detaching the handle portion 27 at the perforation seam 28. The sheath 23 with the rolled sheet 22 is then introduced into an incubator, in which a colony of bacteria is developed in the course of time at all places where bacteria of the type to be detected have reached the roll, this colony becoming apparent by change in the colour of the indicator. After the incubation, the sheath is opened again, the rolled sheet is removed therefrom, the foil ring 25 holding the rolled sheet is removed and the sheet is spread out. The number of bacteria colonies can now be conveniently counted on the spread-out surface of the sheet—if necessary examining both sides of the sheet—whereby there is directly obtained the number of bacteria present in the prescribed amount of liquid, for example, in 10 ml. thereof.

This process operates with extremely great reliability for quantitative purposes, since with suitable formation of the paper which serves as carrier for the nutrient substance and from which the roll is made, it is possible for exactly 10 ml. of water to be absorbed in a specific roll. Tests carried out in comparison with the hitherto usual and substantially more complicated detection methods have unequivocally confirmed the reliability of the novel process.

Moreover, such rolled strips, after having been dried and sterilised, can be preserved as documentary evidence of the result of the investigation. For example, the thoroughly dried and also if necessary disinfected sheet can be immediately filed away in a filing system or a cabinet after it has been provided with the necessary data as regards date and nature of the investigation.

This documentary evidence concerning the results of the investigation, which evidence can be kept in a simple manner, is one advantage of the novel process which it has as compared with most of the methods formerly employed.

With Petri dish investigations, it is true that it is also possible to carry out a sterilisation and storage of the nutrient medium with the colonies of bacteria obtained in the experiment. This storage, however, requires relatively large storage rooms and a quite considerable consumption of unused material. A record of these detected objects in a cabinet or a filing system is unfortunately not possible.

Although the examples described above for the use of the process and of the means used for carrying the process into effect are limited to quite specific fields of use, it should readily be apparent that the novel process and the novel means for carrying it into effect can also be used with advantage for very many other bacteriological works. The sheet or strip can be provided with nutrient media and/or test media for any other desired types of bacteria, if the nutrient media and/or addition susbtances actually known from the literature are applied to the sheet or strip.

The simplicity of and the rapidity with which the novel process can be carried into effect produces special advantages with investigations which are to be carried out in situ without using a laboratory. For example, a practising doctor who visits his patients can carry with him a whole series of separately packed test strips, of which, for example, some are intended for the detection of diphtheria bacteria, others for detecting typhus bacteria or other types of bacteria.

For detecting diphtheria bacteria, it is possible to use, for example, the following solution:

10 g. of meat extract,
5 g. of common salt,
10 g. of peptone,
100 g. of beef serum,
2 g. of potassium tellurite in one litre of water.

For detecting other bacteria, it is possible to use other specific compositions for the nutrient media and test substances, which can be taken from pertinent publications dealing with specific compositions of the formerly employed nutrient media and which can be appropriately used in the preparation of the sheets or strips according to the present invention.

The compositions of nutrient media which have already been referred to above can be used for detecting diphtheria and typhus; a nutrient medium suitable for haemolysis tests is obtained, for example, by impregnating an absorbent paper strip with the following solution:

10 g. of proteose,
5 g. of meat extract,
5 g. of common salt,
1 g. of esculin,
0.33 g. of thalluim sulphate,
0.0013 g. of crystal violet,
60 g. of beef serum (defibrinated) in one litre of water.

In order to confirm his diagnosis, excretions of the patient, for example, sputum or urine, can be taken by the doctor on one and/or others of the strips, the strips can be enclosed in their sheaths and the incubation of the strips can if necessary be carried out in an inside jacket pocket at about body temperature. In the detection of diphtheria, for example, an examination of the incubated strip already clearly shows after a few hours whether the patient is excreting bacteria which are to be considered as the cause of diphtheria. It is no longer necessary to follow the usual practice of sending samples or swabs to a relatively large laboratory; after having confirmed the diagnosis, by the novel process, action can be taken against the disease in the shortest possible time.

Moreover, ambulant investigations of foods or water can also be so substantially simplified and accelerated by the novel process that they can be carried out by unskilled forces and consequently on a much greater scale than formerly.

Occasionally, it may be of particular advantage for several different nutrient media to be arranged on the same sheet or strip.

If it is desired, for example, to detect simultaneously differently reacting strains of bacteria of one and the same basic form or even entirely different groups of bacteria, it is possible for this purpose to use strips which are subdivided into sections by limiting means consisting of moisture-repellent material, the said sections being impregnated with different nutrient substances or test materials. Such a strip is shown in Figures 18 to 20.

The strip 29, the upper end of which is formed as a handle portion 30, is provided, prior to its impregnation with nutrient substances and/or test substances, with limiting means 31 consisting of moisture-repellent material, for example, neutral waxes or paraffins, which penetrate into the interior of the strip and separate the sections 32, 33, 34 and 35 of the strip 29 from one another in a moisture tight manner.

Following the production of these limiting means, the strip sections are then separately impregnated with the substances of the nutrient media.

If such a strip is dipped into liquid, for example milk, or if all the sections of this strip are impressed on an excretion of a sick person, there will be developed on the individual sections always only those forms of bacteria for which the composition of the actual nutrient medium and the test substances in the respective section is particularly suitable. By counting and comparing the individual bacteria colonies which have formed on the different sections of the strip, it is possible to determine the relationship of these individual forms to one another.

With suitably prepared strips, to which are added, for example, antibiotics of different types or of graduated concentration, it is possible to determine the effect of such antibiotics, for example, penicillin or aureomycin, on the bacteria. For comparison purposes, germs such as for example *Thermobacterium bulgaricum* reacting on antibiotics can also be seeded in a manner known per se into the sections of the strip.

Finally, for the purpose of cancelling out the action of an antibiotic, a counteracting substance (for example, penicellinase with penicillin) can be added in certain amounts to the impregnating solution.

With subdivided strips prepared in this manner, it is also possible to carry out series investigations, which produce a very accurate conclusion concerning the behaviour of certain bacteria in relation to antibiotics.

Since the suitably prepared sheets or strips can be manufactured on a large scale with careful supervision, the major part of the labour formerly used for the preparation of suitable nutrient media when carrying out such investigations is avoided, so that the investigations themselves can be carried out quickly with low costs for time and labour, with favourable effects on quite general grounds, but especially for the clinical treatment of numerous cases of illness.

Figures 18 and 19 show one particular form of a sheet or strip in which a highly absorbent strip material, for example, filter paper 36, is covered on both sides with a quite thin, microporous material for example, a thin layer of paper 37 acting as a filter for bacteria. Provided at the side edges are covering fillets 38 of a synthetic resin, wax or paraffin which is applied in liquid form and then solidified, the said fillets sealing of the narrow sides of the sheet or strip 36 in a moisture-tight and bacteria-tight manner. When such a strip is dipped into a liquid, this liquid penetrates through the thin bacteria-filtering layers 37 into the strongly absorbent inner portion 36, the bacteria being retained in the filter layers 37.

The colonies of bacteria developing in the filter layers and nourished by the nutrient media predominantly disposed in the absorbent inner portion 36 are now all disposed on the outside of the strip, and they can therefore be conveniently counted after they have developed.

Such a constructional form of the strip is recommended in all cases where the substances of the nutrient media necessary for impregnating the strip dye the latter so strongly that the colonies of bacteria being developed below the surface of the strip can no longer be recognised from the outside of the strip. This form can therefore also be used when a thick strip with a comparatively large absorption volume is needed in order to take up relatively large amounts of liquid during an investigation.

Figures 20, 21 and 22 show a special stripper device which can be used with particular advantage when a strip is to be used for taking samples from viscous liquids. The strip 1 is provided at its handle 5 with a stripper device which consists of a foil 39 folded tightly around the strip. The ends 40 of the foil are placed together tab-fashion and are firmly connected to one another, for example, by heat-sealing.

If the strip shown in Figure 20 is dipped with its strip section 4 into a viscous liquid, for example, cream, so that the strip is fully saturated as far as the perforation, the lower part of the strip 4 would be thickly coated with cream after withdrawing the said strip. As a result of the stripper 39, 40 being pushed down over the whole of the strip portion 4, the excess of cream 41 can be completely stripped off (see Figure 22), so that subsequently the development of bacteria cultures can be clearly detected on the strip portion 4 which is only thinly wetted with cream.

Such a strip with the stripper device 39, 40 firmly fixed on the handle portion 5 can be supplied in a sheath according to Figure 1.

The examples described in detail above have for their object to explain the extensive utility of the novel process and of the means provided for carrying it into effect. As will already be clear from the description of the examples, the invention is not in any way restricted to these special examples. Any person skilled in the art will readily appreciate that many other bacteriological operations not mentioned in detail herein can be substantially simplified by suitable compositions of nutrient media and test substances which are per se outside the scope of the invention being combined with the carriers of nutrient media constructed according to the invention, preferably in the form of a sheet or strip.

I claim:

1. A device for taking samples and for detecting certain types of bacteria in liquids which consists of a sterile flat-like structure made of absorbent material, which does not unfavorably influence the development of the bacteria, and which is provided with water-soluble, dry nutrient substances and test substances, and has a mechanical strength, sufficiently for it to be freely handled even after its immersion in a liquid to be tested and after it has adsorbed part of that liquid, said flat-like structure having a handle portion connectable with but separable therefrom and having a pocket-like collapsible sterile sheath made of elastic foil, which does not unfavorably influence the development of the bacteria, and which serves to enclose the flat-like structure and its handle portion in a fluid-tight manner.

2. A device for taking samples and for detecting certain types of bacteria in liquids, which consists of a sterile sheet made of absorbent material, which does not unfavorably influence the development of the bacteria, which is impregnated with water-soluble dry nutrient substances and test substances and having a mechanical strength sufficiently for it to be freely handled even after its immersion in a liquid to be tested and after absorption of part of that liquid, said sterile sheet having a handle portion connectable to but separable from an edge thereof and having a pocket-like, collapsible sterile sheath made of elastic foil, which does not influence unfavorably the development of the bacteria, and which serves to enclose the sterile sheet and its handle portion in a fluid-tight manner.

3. A device for taking samples and for detecting certain types of bacteria in liquids, which consists of a sterile strip made of absorbent paper, which does not influence unfavorably the development of the bacteria, which is impregnated with water-soluble dry nutrient substances and test substances and which has a mechanical strength sufficient for it to be freely handled even after its immersion in a liquid to be tested and after absorption of part of that liquid, said sterile strip having a separable handle portion provided at one end of the sterile strip and connected to the strip through the intermediary of a perforation seam, and having a pocket-like flat collapsible sterile sheath made of transparent elastic foil, which does not influence unfavorably the development of the bacteria, but which serves to enclose the sterile strip and its handle portion in a fluid-tight manner.

4. A device according to claim 2, wherein the flat structure is covered, except for the separable handle portion, by an impervious elastic foil in the shape of a sheet and being rolled up together with this sheet to form a loosely wound coil.

5. A device for taking samples and for detecting certain types of bacteria in liquids which consists of a flat-like structure in the form of a sheet of sterilizable, absorbent material which can be freely handled and which does not disadvantageously influence the development of bacteria, and provided with water-soluble dry nutrient substances and test substances, said flat-like structure having a handle portion connectable with but separable therefrom and having a compressible foil sheath serving to enclose the flat-like structure and its handle portion, said flat-like structure being folded together with interleaving of a neutral foil and being held in the folded position by neutral stiffening parts.

6. A device for taking samples and for detecting certain types of bacteria in liquids which consists of a flat structure packed in sterile manner in a sterile sheath made of elastic foil and fitted with a handle portion which is readily separable therefrom, said flat structure being of absorbent material which does not unfavorably influence the development of bacteria and impregnated with water-soluble, dry nutrient substances and test substances, and provided with a microporous bacteria-filtering layer which covers the flat structure.

7. A device according to claim 3, wherein the pocket-like flat collapsible sterile sheath consists of shrinkable foil.

References Cited in the file of this patent

UNITED STATES PATENTS

| 2,672,432 | Goetz | Mar. 16, 1954 |
| 2,677,646 | Lovell | May 4, 1954 |
| 2,677,647 | Lovell | May 4, 1954 |
| 2,771,398 | Snyder | Nov. 20, 1956 |
| 2,784,146 | Goldman | Mar. 5, 1957 |

OTHER REFERENCES

"Journal Amer. Water Works Assoc.," vol. 45, No. 11, November 1953, pages 1203 and 1208.